United States Patent Office 3,164,857
Patented Jan. 12, 1965

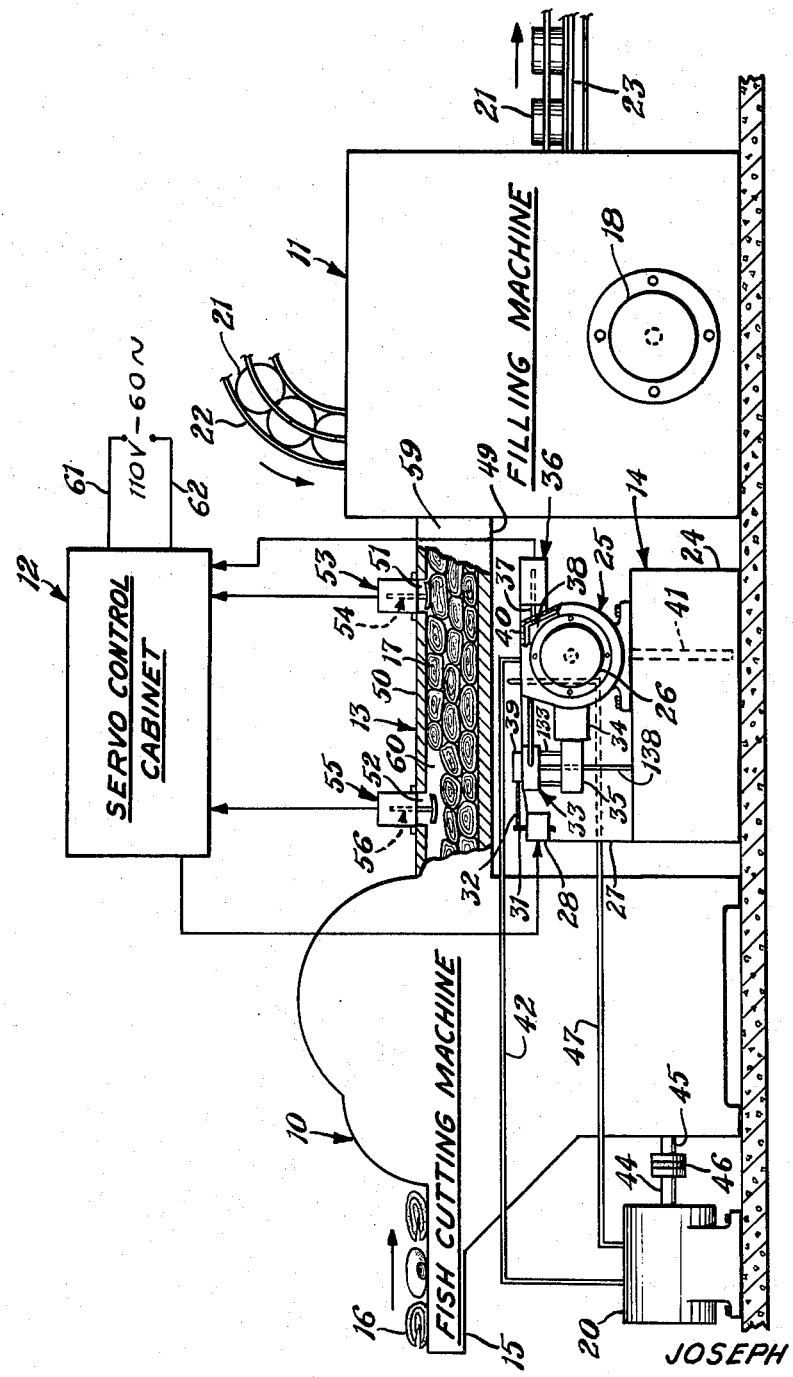

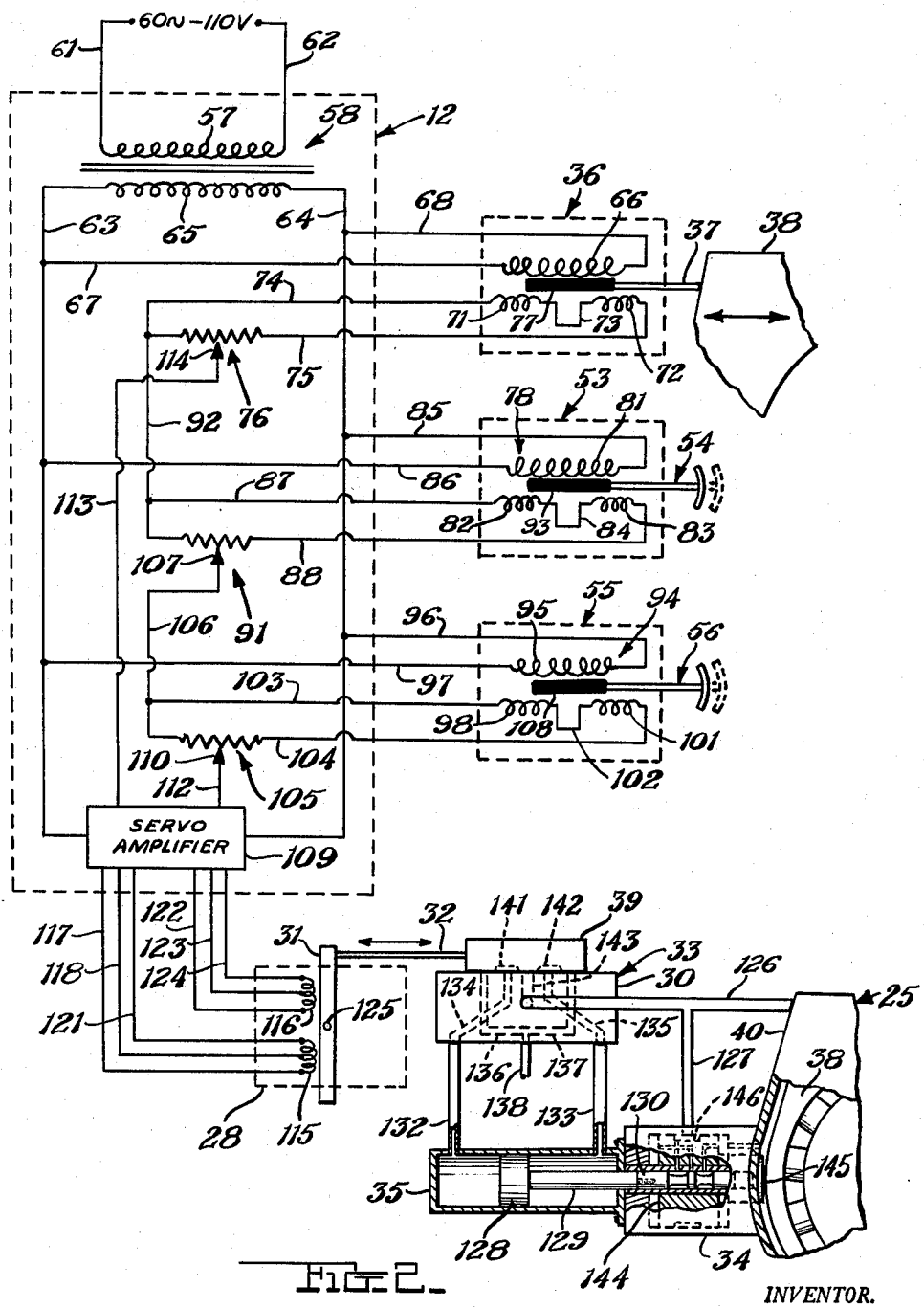
Jan. 12, 1965     J. J. SENNELLO     3,164,857
FISH CANNING CONTROL APPARATUS
Filed March 6, 1962     3 Sheets-Sheet 2
INVENTOR.
JOSEPH J. SENNELLO
BY Walter H Beland
AGENT

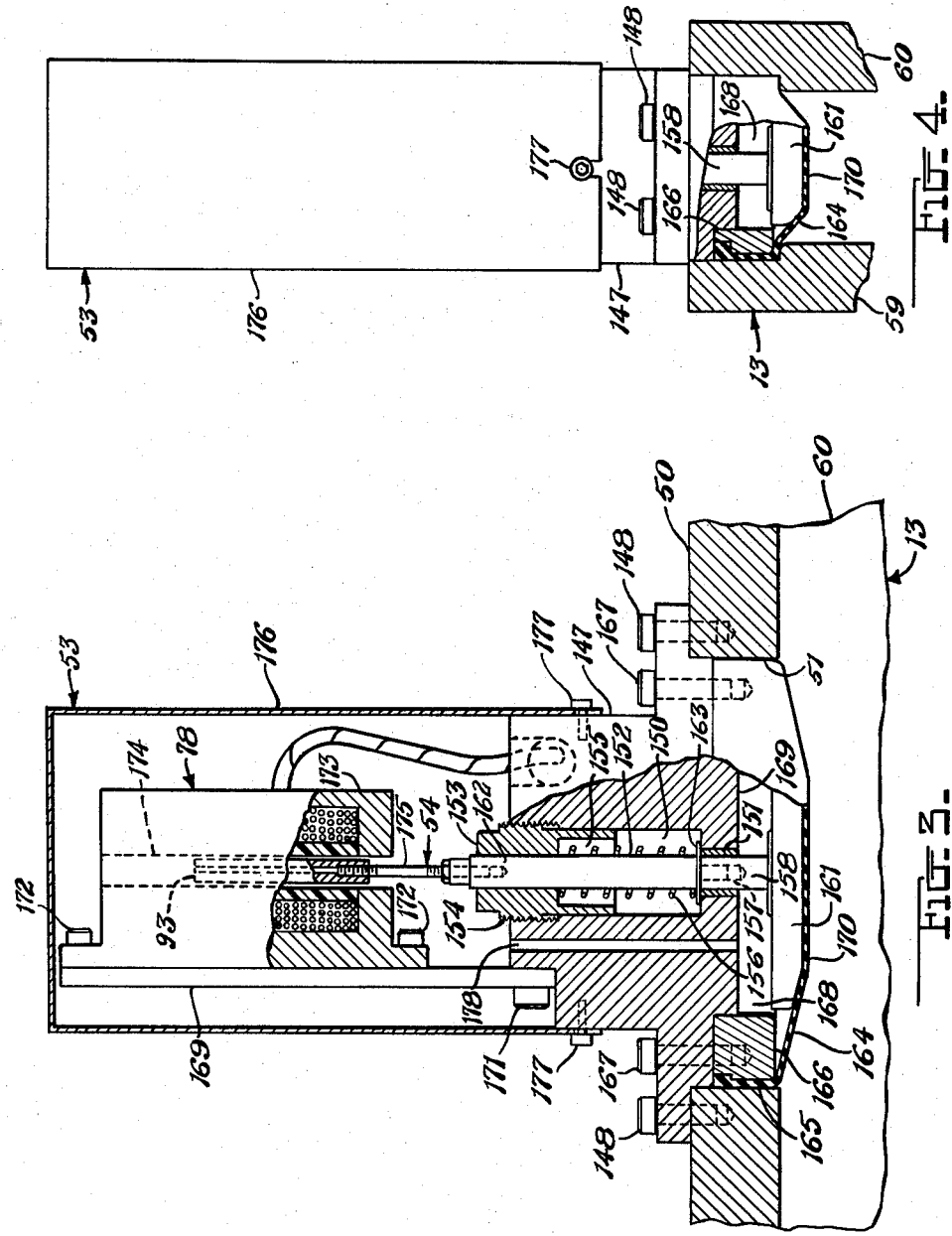

3,164,857
FISH CANNING CONTROL APPARATUS
Joseph J. Sennello, Oak Lawn, Ill., assignor to Continental Can Company, Inc., New York, N.Y., a corporation of New York
Filed Mar. 6, 1962, Ser. No. 177,868
5 Claims. (Cl. 17—4)

The invention relates to the art of fish canning and particularly, to the canning of relatively large fish such as tuna or salmon.

In the canning of such fish the common practice in the industry is to use a can filling machine and a fish cutting machine connected together by a fish delivery tunnel. Dressed fish is fed into a gang cutter in the fish cutting machine which cuts the fish into fillets having a thickness slightly less than the height of the cans to be filled. The cut-up fish is then moved into the fish delivery tunnel by means of rotating feeding fingers. When the supply of fish in the tunnel reaches the filling machine the filling machine is started to commence filling cans. With such an arrangement, it is a necessity that the filling machine always be supplied with a solid stream of fish through the tunnel so that each of the cans fed into the filling machine will be filled to the desired capacity. It is also of great importance that the tunnel extending between the fish cutting machine and the filling machine does not become oversupplied with fish to the extent that the fish feeding fingers in the fish cutting machine being to compact the fish in the tunnel resulting in the breaking up of the solid chunks of fish which, if not immediately corrected, could result in the whole lot of filled cans being down-graded resulting in a direct monetary loss when the lot is sold.

Since the filling machine and the fish cutting machine each has its own individual drive, it has become the practice in the industry to regulate, by the best prior art means, the speed of the drive of the fish cutting machine in order to attempt to regulate the speed of the fish cutting operation to meet the exact demands of the filling machine. Much work has been done in the past in order to solve the problem of coordinating the speed of the fish cutting machine to exactly meet the demands of the can filling machine; with at best, only a moderate degree of success being achieved. Perhaps the main reason for the lack of a practical solution to the problem by the known prior art means for solving it is that all of such means have been complicated in nature. By complicated is meant that many mechanical linkages are used which are difficult to adjust and keep adjusted and which eventually develop free play due to wear which is very difficult to compensate for.

By way of contrast, the presently disclosed arrangement uses a minimum of mechanism and such that is used for the most part is readily purchased on the open market.

Accordingly, it is the general object of the invention to provide a simplified and reliable control system for controlling the flow of fish in the fish tunnel extending between the fish cutting machine and the can filling machine.

It is a further and more specific object of the invention to provide a simplified and reliable control system in which the means for detecting the amount of fish in the tunnel is primarily electrical in nature and in which the drive means for the fish cutting machine, the speed of which is varied in response to signals from the detecting means, is of the hydraulic type.

It is a still further and more specific object of the invention to provide a novel, reliable and sanitary type of electrically operated detecting unit which mounts in a wall of the fish tunnel and generates an electrical signal in response to the amount of fish in the tunnel adjacent to the unit.

The above and other objects of the invention will be better understood by referring to the following description and drawings in which:

FIG. 1 is a side elevation view partly in section, of the fish cutting and filling machines and electrical and hydraulic components of the control and drive system;

FIG. 2 is a diagram of the electro-hydraulic control system;

FIG. 3 is a side elevation view, mostly in cross-section through one of the electrical detecting heads mounted in the fish tunnel; and FIG. 4 is an end view partly in section of the detecting unit of FIG. 3.

Referring to FIG. 1 of the drawings, it will be seen that the fish cutting machine is generally indicated by the numeral 10. The can filling machine is generally indicated by 11, the servo control cabinet generally by 12, the fish tunnel generally by 13, and the hydraulic pump and control unit generally by 14. The fish cutting machine 10 has a horizontal endless belt or chain type of conveying table 15 on which dressed fish 16 are placed for being conveyed to the right thereon into the machine where they are cut upt into fillets which are transferred into the fish tunnel 13 by means of rotating feed fingers (not shown): the filleted fish in the fish tunnel being indicated by the numeral 17. The fish cutting machine, including the horizontal fish infeed conveyor table 15 is driven by a hydraulic motor 20. With the exception of the replacement of its usual electric drive motor by the hydraulic drive motor 20, the fish cutting machine itself is unchanged. The fish cutting machine depicted is a well known type in the industry and a detailed description of the operation thereof is not necessary for the purpose of clearly setting forth the present invention.

The can filling machine 11 is also of a standard type in the industry and has its own adjustable speed drive indicated at 18. Empty cans 21 are fed down a feed chute 22 into the filling machine by means of gravity. The cans are filled with fish supplied through the tunnel 13 and the filled cans pass out of the machine on a horizontal conveyor 23. The speed of the filling machine is independently adjusted to fill a set number of cans within a unit of time of given length.

The hydraulic pump and control unit 14 has a hydraulic fluid reservoir 24 on which is mounted a hydraulic pump 25 which has a variable volumetric output. The pump 25 is driven by an integrally mounted electric motor 26. Mounted on a support plate 27 on the reservoir is a torque motor 28 having an armature 31 which has one end of an operating rod 32 attached thereto. The other end of the operating rod 32 is attached to the slide valve member 39 of a hydraulic servo valve 33. The hydraulic servo valve 33 is also mounted on the plate 27. Mounted on one side of the hydraulic pump 25 is a force amplifying hydraulic cylinder 34. A control stroking cylinder 35 is mounted in axial alignment with the hydraulic cylinder 34. Mounted on the side of the hydraulic pump 25 opposite hydraulic cylinders 34 and 35, is a linear variable differential transformer generally 36; having an operating rod 37. The end of the operating rod 37 that projects out of the transformer passes through the pump housing 40 and touchingly engages the side of a slide block 38; the position of which, within the pump housing, determines the volumetric output rate of the pump.

Fluid from the pump 25 is discharged at high pressure through a pipe 42 for delivery to the hydraulic motor 20. The high pressure fluid acts to turn the shaft 44 of the hydraulic motor. The shaft 44 is coupled to the input shaft 45 of the fish cutting machine by means of a flexible coupling 46. The fluid delivered through line 42, upon performing its work of driving the motor 20, is returned to the suction side of the pump through a pipe 47. The hydraulic system is maintained full of fluid by means of a pipe 41 which extends from the suction side of the pump into the fluid reservoir 24.

The hydraulic pump and control unit 14 is of a standard design; the construction details of which form no part of the present invention. One such pump and control unit that is quite similar in construction and operation to the unit 14, is a type "AV" manufactured by the Oil Gear Co., Milwaukee, Wisconsin, U.S.A. Such an "AV" pump and control unit may be purchased complete, including a torque motor simliar to the torque motor 28, a servo valve similar to the servo valve 33, hydraulic cylinders similar to cylinders 34 and 35, a drive motor similar to the motor 26, a linear variable differential transformer similar to the transformer 36, and a hydraulic reservoir similar to the reservoir 24. The hydraulic motor 20 is also of a type readily purchasable on the open market and is selected to meet the power requirements of the fish cutting machine. The pump unit is selected as to size and delivery rate to meet the demands of the selected motor. Furthermore, the motor 20 is of a type whose shaft 44 will rotate at a speed proportional to the volumetric fluid flow rate being delivered to the motor through the pipe 42. Therefore, by varying the volumetric output rate of the pump 25 through the pipe 42, the speed of the motor 20 will be varied accordingly and hence the rate at which fish 16 on the horizontal conveyor table 15 are fed into the fish cutting machine 10 will be varied accordingly. The feeding of the fish fillets 17 into the tunnel 13 by the fish cutting machine will also vary proportionately with respect to the speed of the motor 20.

The fish tunnel 13 has an upper wall 50 having openings 51 and 52 therein. Mounted in overlying relationship with respect to the opening 51 is a detecting unit generally indicated at 53. The detecting unit 53 has a vertically movable detecting element generally indicated at 54. In overlying relationship with respect to the opening 52 is a second detecting unit generally indicated at 55, and having a detecting element generally indicated at 56. The detecting units 53 and 55 are of similar construction, the details of which will be described later. The fish tunnel also has a bottom wall 49 and side walls 59 and 60.

The servo control cabinet, generally indicated at 12, is supplied with a source of alternating current, such as ordinary 110 volt-60 cycle house current through wires 61 and 62. Electrical signals developed by the detecting units 53 and 55 and also by the linear variable differential transformer 36 are directed into the servo control cabinet as indicated by the arrows. Output signals from the servo control cabinet 12 developed in response to the input signals are directed to the torque motor 28 for the actuation thereof, as indicated by the arrow. The torque motor operates to vary the volumetric output rate of the pump 25 through the pipe 42, and hence operates to vary the speed of the hydraulic motor 20 and the fish cutting machine 10. It is to be noted that the detecting unit 53 is located downstream with respect to the flow of fish in the tunnel 13 and closely adjacent the filling machine 11. The detecting unit 55 is located upstream of the flow of fish closely adjacent the fish cutting machine.

The operation of the equipment is as follows: when starting up with an empty fish tunnel the motor 26 for the hydraulic pump is started and dressed fish 16 is supplied to the horizontal conveyor table 15. The servo control cabinet wires 61 and 62 are then energized by the 110 volt-60 cycle power supply to complete the energization of the control system. Since the fish tunnel is empty, the detecting elements 54 and 56 will be caused to extend downwardly to their full downward limit. When the detecting elements are in this position maximum output signals are developed by the detecting units 53 and 55 and transmitted to the servo control cabinet. A responsive signal is generated in the servo control cabinet and is transmitted to the torque motor 28, causing the armature 31 of the torque motor to assume a position which through operating rod 32, servo valve 33, control stroking hydraulic cylinder 35, and force amplifying cylinder 34 causes the slide block 38 in the pump to be moved to a point whereat it will cause a pre-set maximum flow of fluid through pipe 42 causing the motor 20 to run at a pre-set maximum speed. When the slide block 38 has reached the point at which it causes the pump to develop its pre-set maximum output, the linear variable differential transformer 36, by reason of the movement of the operating rod 37 following the slide block 38, will develop an electrical signal equal to and of opposite phase to the sum of the signals from the detecting units 53 and 55 such that the three signals when added together cancel each other. This causes the termination of the signal to the torque motor 28 the armature of which then returns to a neutral position leaving the pump delivering at the pre-set maximum rate. With the fish cutting machine thus running at its pre-set maximum speed, the dressed fish 16 will be conveyed into the fish cutting machine where they will be cut up into fillets and the fillets will be fed into the fish tunnel causing the fish tunnel to begin filling up. As the fillets 17 move along in the tunnel toward the filling machine 11, they begin to stack up one upon the other to fill the full height of the tunnel with fish.

When the fish being moved through the tunnel fills the tunnel to substantially its full height under the detecting unit 53, the detecting element 54 will be caused to move upwardly by the fish until it has reached its full upward position. The detecting element 54 when in its full upward position causes the electrical signal output of the detecting unit 53 to drop to zero. This leaves the opposed phase signal from the linear variable differential transformer 36 substantially double that being generated by the detecting unit 55. Due to this signal inbalance, a responsive signal is developed in the servo control cabinet which is transmitted to the torque motor 28 causing the armature 31 thereof to move from its neutral position to a new position opposite from the speed up position to cause the shifting of the slide block 38 to a different point at which the delivery of the pump through the pipe 42 will be at a pre-determined medium rate causing the motor 20 to assume a pre-determined medium speed. The fish cutter will thus be caused to run at the pre-determined medium speed. When the slide block 38 has arrived at its pre-determined medium speed position the signal developed by the linear variable differential transformer 36 will be equal to and opposite the signal developed by the detecting unit 55 which effects the termination of the signal to the torque motor 28 causing the armature 31 thereof to return to its neutral position leaving the pump 25 delivering fluid at its medium rate.

The filling machine can now be started with empty cans being fed in through the chute 22 and filled cans being fed out on the conveyor 23. When the fish cutting machine is running at medium speed it should closely meet the demands of the filling machine for fish. As shown in FIG. 1 the fish cutting machine is running at medium speed due to the detecting element 54 being all the way up and the detecting element 56 being all the way down, which are the desired normal operating positions of these elements.

If the fish cutting machine when running at its medium speed is running slightly faster than is necessary to meet the demand of the filling machine for fish, the fish tunnel will begin to slowly fill up to its full height further and further back toward the fish cutting machine, until eventually the tunnel will be filled to its full height directly under the detecting unit 55 causing the detecting element 56 to be moved upwardly slightly. This slight upward movement will cause a proportional slowing down of the motor 20, caused by a reduction of the magnitude of the signal being transmitted from the detecting unit 55 to the servo control cabinet. If the height of the fish still continues to build up under the detecting unit 55, eventually the detecting element 56 will be moved upwardly to its full extent. When in this position the signal from the detecting unit 55 is reduced to substantially zero along with the signal from the detecting unit 53 leaving the signal from the linear variable differential transformer 36 unopposed. This unopposed signal causes a signal to be developed in the servo control cabinet to actuate the torque motor 28 such that the armature 31 thereof will be actuated to assume a position to cause the volumetric output of the pump 25 to drop to the point where the fish cutting machine either comes to a standstill or is operating at a very low speed. The filling machine will now begin using up the fish in the tunnel faster than it is being supplied causing the detecting element 56 to again begin lowering to increase the speed of the fish cutting machine and the rate of the fish delivery into the tunnel.

If, on the other hand, the fish cutting machine is not meeting the requirements of the filling machine when the fish cutting machine is running at the normal medium speed, the height of fish in the tunnel under the detecting unit 53 will diminish causing the fish cutting machine to gradually pick up speed, due to the lowering of element 54, until the tunnel is again full at this point, which causes the detecting element 54 to again be moved fully upwardly to return the fish cutting machine to its normal medium speed.

A better understanding of the operation of the control system may be obtained by referring to FIG. 2 in which the control system is shown in more detail. The 110 volt-60 cycle power supply is impressed on the primary winding 57 of a transformer generally 58 in the servo control cabinet 12 through wires 61 and 62. Wires 63 and 64 are connected to the secondary coil 65 of the transformer with the voltage differential between wires 63 and 64 being reduced to a suitable voltage for linear variable differential transformer operation. 55 volts have been found to give satisfactory operation. Linear variable differential transformer 36 has a primary coil 66 connected to wire 63 by wire 67 and to wire 64 by wire 68. It also has a pair of secondary coils 71 and 72 connected in series opposing by a wire 73. A wire 74 is connected to coil 71 and a wire 75 is connected to coil 72. Wire 75 has interposed therein an adjustable potentiometer 76. The left end of the operating rod 37 has attached thereto for movement therewith, the iron core 77 of the transformer 36. The right end of the operating rod 37 abuts against the side of the pump slide block 38 and is urged by means not shown to follow the movement of the slide block 38 to the left or right. The detecting unit 53 has a linear variable differential transformer generally indicated at 78 having a primary coil 81 and two secondary coils 82 and 83. Secondary coils 82 and 83 are connected in series opposing by a wire 84. Primary coil 81 is connected to wire 64 by a wire 85 and to wire 63 by a wire 86. Secondary coil 82 is connected to a wire 87 and secondary coil 83 is connected to a wire 88 having interposed therein an adjustable potentiometer 91. Wires 74, 75, 87 and 88 are in turn connected together by means of wire 92. The detecting element 54 has attached thereto the movable iron core of the transformer 78, the core being indicated at 93.

The detecting unit 55 has a linear variable differential transformer generally 94. Transformer 94 has a primary coil 95 connected to wire 64 by a wire 96 and to wire 63 by wire 97. It also has a pair of secondary coils 98 and 101 connected in series opposing by a wire 102. Coil 98 is attached to a wire 103 and coil 101 is attached to a wire 104 having interposed therein an adjustable potentiometer generally 105. Wires 103 and 104 are connected by means of a wire 106 to the adjustable tap 107 of the potentiometer 91. The detecting element 56 has attached thereto the movable iron core 108 of the transformer 94.

Wires 63 and 64 terminate in a servo amplifier 109 and supply power thereto. The servo amplifier 109 is designed and sized to operate the torque motor 28 and is of a standard design readily obtainable on the open market. A wire 112 connects the tap member 110 of adjustable potentiometer 105 to the servo amplifier 109. Wire 113 connects the servo amplifier 109 with the adjustable tap 114 of the potentiometer 76.

The torque motor 28 has a pair of center tap coils 115 and 116. Wires 117, 118 and 121 connect coil 115 to the servo amplifier 109. Wires 122, 123 and 124 connect coil 116 to the servo amplifier 109. The armature 31 of the torque motor 28 is pivotably mounted on a pin 125. The left end of rod 32 is connected to the armature 31 and the right end to the slide valve 39 to impart movement of the slide valve 39 to the left or the right. The pump 25 has incorporated in its housing 40 a small auxiliary pump, not shown, which supplies hydraulic fluid at a constant pressure for control operation through pipe 126 and branch pipe 127 to the hydraulic servo valve 33 and force amplifying cylinder 34 respectively. The control stroking cylinder 35 has therein a movable piston 128 having on one side thereof a piston rod 129. The right end of piston rod 129 has attached thereto a spool valve 130. Cylinder 35 has at one end a fluid pipe 132 and at the other a fluid pipe 133. Fluid pipes 132 and 133 are connected to passages 134 and 135 respectively in the valve block 30 of the valve 33. Passages 136 and 137 in valve block 30 connect to a pipe 138 that returns to the reservoir 24. The slide valve 39 has internal ports 141 and 142. Valve block 30 also has a passageway 143 communicating the pipe 126 with the slide valve 39.

The force amplifying hydraulic cylinder 34 has a piston 144 which has attached on the right side thereof a hollow piston rod 145. The end of the piston rod 145 abuts the pump slide block 38. The slide block 38 is always urged toward the left by hydraulic means within the pump, such that if no fluid pressure is exerted on the left hand side of the piston 144, the slide block will be caused to move to the full extent of its travel to the left. When, however, hydraulic pressure is applied on the left hand side of the piston 144, the force applied by piston rod 145 against the slide block 38 will override the biasing force of the slide block 38 to the left and the slide block will be caused to move to a position to the right. Hydraulic fluid is supplied to the spool valve 130 from pipe 127 through a port 146 in the piston 144. The piston 144 is further ported in such a manner that if the spool valve 130 is moved to the left, the piston will follow it to the left and center itself with respect to the spool valve in its new position. If the spool valve is conversely moved to the right, the piston will again follow the spool valve to the right and center itself again with respect to the spool valve in the new position to the right. In this manner the position of the piston 144 is controlled by the positioning of the spool valve 130 by the piston rod 129. In operation, as the slide valve 39 is moved toward the right by the rod 32, the port 141 is communicated with passages 134 and 143 to supply hydraulic fluid from pipe 126 through pipe 132 to move the piston 128 to the right. At the same time the port 142 is connected with passages 135 and 137 so that the hydraulic fluid on the right side of piston 128 can be exhausted back to the reservoir through pipes 133 and 138. As the piston 128 and the piston rod 129 move to the right, the spool valve 130 will move to the right and the piston 144 in following the spool valve will also move to the right. The piston rod 145 will, therefore, exert pressure on the slide block 38 moving it to the right, the movement of which toward the right causes the volumetric output rate of the pump 25 to increase. If, on the other hand, the operating rod 32 is caused to be moved to the left by the armature 31, the slide valve 39 will have its port 141 in communication with passageways 134 and 136 and the port 142 in communication with passageways 135 and 143. This will cause the piston 128 to be moved to the left and as a consequence, the piston 144 will also move to the left in following the movement of the spool valve 130. The movement to the left of the piston 144 is brought about by the biasing pressure of the slide block 38 to the left against the end of the piston rod 145. As the slide block 38 moves towards the left, it causes the volumetric output rate of the pump to steadily decrease, until when the slide block is all the way to the left as far as it will go, the output of the pump is either zero or a very small volume rate. In actual operation of the apparatus, the piston 128 will be shifted only slightly either to the right or to the left from the position shown to effect the increasing or decreasing of the volume rate of the pump 25.

The potentiometers 91 and 105 are adjusted so as to utilize only a portion of the full voltage developed in the secondary circuits of the transformers 78 and 94, respectively, which is generated when the detecting elements 54 and 56 are in their lowermost position as viewed in FIG. 1 or in the dotted line positions in FIG. 2. With detecting elements 54 and 56 in the dotted line positions, potentiometers 91 and 105 can be adjusted to produce equal signal voltages of the same phase which are added together algebraically and impressed on the secondary circuit of the transformer 36. The core 77 of the transformer 36 is movable within the transformer between positions such that the voltage induced in the secondary circuit thereof is always 180° out of phase with the voltage being supplied from potentiometers 105 and 91 through wire 92. The resulting induced voltage output is the algebraic sum of the voltages tapped off of potentiometers 105, 91 and the induced voltage in the secondary circuit of transformer 36 which is tapped off in a desired amount by the tap 114 of the potentiometer 76 and transmitted through wire 113 to the servo amplifier 109. If the sum of the voltages from the linear variable differential transformers 78 and 94 is greater than the voltage produced by the linear variable differential transformer 36, the command signal resulting from the algebraic addition of these voltages transmitted through wire 113 to the servo amplifier will be of one phase. If, on the other hand, the sum of the voltages from the variable differential transformers 78 and 94 is less than the voltage produced by the variable differential transformer 36, the resulting command signal; upon the addition of the three voltages algebraically; which is delivered by wire 113 into the servo amplifier will be of an opposite phase.

Whenever the sum of the voltages produced by the transformers 78 and 94 is greater than that produced by the transformer 36 the resulting phase of the command signal through wire 113 to the servo amplifier 109, will result in a direct current voltage being impressed across wires 118 and 112 and wires 123 and 124 which, in turn, will cause the armature 31 of the torque motor 28 to rotate in a clockwise direction about the pivot pin 125. This causes the operating rod 32 to move to the right in which direction of movement the delivery rate of the pump 25 is caused to increase; which increases the speed of the motor 20 and the fish cutting machine 10 as explained before. If, on the other hand, the algebraic sum of the voltages from transformers 36, 78 and 94 results in the voltage of transformer 36 being larger than the combined voltages of transformers 78 and 94, the resulting command voltage in wire 113 being of an opposite phase, will cause the servo amplifier 109 to produce a direct current voltage across wires 117 and 118 and 122 and 123; which results in the armature of the torque motor being caused to rotate counterclockwise about the pin 125 resulting in the movement of the operating rod 32 to the left; which acts to slow down the volumetric delivery rate of the pump 25. Whenever the voltages from transformers 36, 78 and 94 cancel each other out completely, no command signal will be impressed on wire 113 and the armature 31 of the torque motor 28 will remain in a neutral position in which fluid flow into or out of the hydraulic cylinder 35 is prevented, which results in piston 128 remaining in a fixed position. This results in the slide block 38 remaining stationary and the delivery of fluid through the pipe 42 being at a constant volume rate dependent upon the location of the slide block 38.

At the start of a can filling operation with the fish tunnel empty, the detecting elements 54 and 56 will be extended downwardly to their full extent with respect to the FIG. 1 showing, or, to the dotted line positions of FIG. 2. This will cause maximum voltage signals to be produced in transformers 78 and 94, which signals are added and impressed on the secondary circuit of the transformer 36. If, at this time, the slide block 38 is positioned in the place where it causes the pump 25 to deliver fluid at the maximum pre-set rate, the operating rod 37 in following the slide block 38 will have positioned the core 77 of transformer 36 at the point where the voltage induced in the secondary circuit of transformer 36 will be exactly equal to and of opposite phase to the sum of the voltages from transformers 78 and 94 such that the voltages will cancel each other out and no command signal will be impressed on wire 113 to change the delivery rate of the pump 25. Consequently, the pump 25 will deliver at the desired maximum pre-set rate. If, on the other hand, the slide block 32 at the time of start up was positioned too far to the left, with respect to its showing in the lower right hand corner of FIG. 2, or too far to the right with respect to the fragmentary piece of the slide block shown in the upper right hand corner of FIG. 2, the added voltages from transformers 78 and 94 will be greater than the opposite phase voltage produced by the transformer 36, such that a command voltage will appear in wire 113 to cause the servo amplifier 109 to position the armature 31 of the torque motor 28 to its speed up position which will result in the shifting of the slide block 38 until it is shifted to the position where the pump will deliver fluid at the maximum pre-set rate. When the slide block 38 arrives at this position, the core 77 in transformer 36 will be so positioned that the command signal to the servo amplifier will drop to zero due to the voltages produced by transformers 78, 94 and 36 cancelling each other out. The armature of the torque motor 28 will then return to a neutral position which results in the fluid delivery rate of the pump remaining constant at the pre-set maximum rate.

As the fish fillets 17 in FIG. 1 fill the tunnel until the condition is obtained where the detecting element 54 is now in the full up position and the detecting element 56 is in the full down position, or in FIG. 2 the element 54 will be in the solid line position and the element 56 will be in the dotted line position; no voltage will now be produced by the transformer 78 leaving only the voltage from transformer 94 to oppose the voltage produced by the transformer 36. Since the pump 25 was just previously operating to supply fluid to motor 20 at a maximum rate the core 77 of transformer 36 was positioned to produce a voltage in the secondary circuit of transformer 36 equal and of opposite phase to the combined maximum voltages utilized from transformers 78 and 94. By thus dropping out the voltage produced by the transformer 78, the voltage produced by the transformer 36 will override that produced by the transformer 94 causing a command signal being produced in wire 113 to servo amplifier 109 of a phase which results in the slide block 38 being moved toward the point where it causes the pump 25 to deliver fluid at the predetermined medium rate. When the slide block 38 arrives at the position where it causes the output of the pump to be at the desired medium rate, the core 77 of transformer 36 will have moved from its maximum voltage output position to its new position at which it will cause the transformer 36 to have an output voltage just equal to and of opposite phase to the lone output from the transformer 94; which causes the termination of the command signal in the wire 113 resulting in the volumetric output rate of the pump remaining constant at the predetermined medium rate.

If the fish tunnel now becomes full to the extent that both detecting elements 54 and 56 are in their uppermost positions as viewed in FIGURE 1, or both in the solid line positions as shown in FIGURE 2; transformers 78 and 94 will have no voltage output signal: leaving the output signal from the transformer 36 unopposed and impressed on wire 113, where it will continue to be impressed in diminishing value as the slide block 38 is moved to the position where it will cause the output of the pump to drop to either zero or a very small minimum value. When the slide block reaches this position, the operating rod 37 of the transformer 36 will have positioned the core 77 to the position where the transformer 36 output signal drops to zero. When this position is reached, no further command signal will be impressed on wire 113 and the armature of the torque motor 28 will assume a neutral position leaving the slide block 38 fixed in the position of zero or minimum pump output. This results in the fish cutting machine either discontinuing feeding more fish into the tunnel, or feeding the fish at a very low minimum rate. The filling machine, shortly thereafter, will have used sufficient fish to cause the detecting element 56 to drop back to its normal down position and cause the fish cutting machine to again return to its normal medium operating speed at which it will again closely meet the demand of the filling machine.

It is to be understood that it is within the scope of the invention to provide one or more additional detecting units between the units 53 and 55, the voltage outputs of which, when added to the outputs from the units 53 and 55, will result in the fish cutting machine having one or more additional medium speeds between which it will operate during the normal can filling operation.

Further, in accordance with the invention, the detecting units 53 and 55 are of novel construction, the details of which will best be understood by referring to FIGURES 3 and 4. Since the units 53 and 55 are identical, only a description of the unit 53 will be necessary. A block 147 mounts in the opening 51 in the upper wall 50 of the fish tunnel 13. The block 147 is secured to the wall 50 by means of threaded fasteners 148. The block 147 has a large vertical bore 150 that is threaded at the upper end thereof. At the bottom of the bore 150 and concentric therewith is a smaller bore 151 that is bushed with a suitable bearing material. A round rod portion 152 of the detecting element 54 is slidably mounted at its lower end in the bushed bore 151. At its upper end, the rod 152 is slidably mounted in an adjustable bushing 153. The bushing 153 is threaded at 154 to engage the threads of the bore 150 for vertical adjustment of the bushing 153 in the bore 150. The bushing 153 has a bore 155 which forms a pocket in which the upper end of a compression spring 156 is seated. The rod 152 is formed from two separate aligned pieces that are threadably connected together at 157. The lower rod piece 158 has attached at its lower end a generally flat shoe 161. Clamped between the lower rod portion 158 and the upper rod portion 162 is a washer 163 against which the bottom of the spring 156 rests. The spring 156 urges the rod 152 downwardly with the downward extent of movement of the rod 152 being limited by the undersurface of the washer 163 contacting the bottom surface of the bore 150. In order to seal the unit 53 from being fouled by particles of fish entering the unit, a rubber boot 164 is placed over the undersurface of the shoe 161. The boot 164 has a vertical circumferential wall 165, the outer surface of which is held tightly sealed against the periphery of the opening 51 by a circumferential ring 166. Ring 166 is securely held in place in a recess in the bottom surface of the block 147 by means of threaded fasteners 167. The shoe 161 loosely slidably fits into the inner peripheral opening of the ring 166. The opening being designated at 168, when the shoe 161 is in its lowermost position, as shown; the generally horizontal wall 170 of the boot 164 will be stretched tight on the undersurface of the shoe. When the shoe 161 is in its uppermost position, in which position the top surface of the shoe immediately surrounding the bottom portion 158 of the rod 152 is in abutting contact with the bottom surface 169 of the block 147, the wall 170 of the boot will be substantially in a flat plane and the boot will be in only a lightly stretched condition. The pressure of the spring 156 is adjusted by means of the adjustable bushing 153 to just overcome the tension of the boot so that the washer 163 will seat in the bottom of the bore 150 whenever there is no fish in the tunnel under the boot of such height that the fish touches the boot. A vertical mounting bracket 169 is mounted by means of threaded fasteners 171 to the mounting block 147. Linear variable differential transformer 78 is mounted onto bracket 169 by means of threaded fasteners 172. The transformer housing 173 is provided with an aperture 174 that is in axial alignment with the rod 152. The iron transformer core 93 is movable within the aperture 174. A connecting rod 175 is threaded at its upper end into the lower end of the transformer core 93 and at its lower end into the upper end of the rod 152. The position of the core 93 can be adjusted within the housing 173 by changing the depth in which the connecting rod 175 is threaded into the rod 152. A protective cover 176 fits over the transformer 78 and is attached to the block 147 by threaded fasteners 177. The core 93 is adjusted by means of the rod 175 so that when the shoe 161 is in its full up position the voltage output of the transformer will be zero.

In order to prevent the unit from becoming air bound, free movement of air is provided by means of a bore 178 that communicates the opening 168 with the interior of the cover 176. It will be appreciated that the boot 164 may be fabricated from either natural or synthetic rubber or from other resilient plastic materials, the main criterion being that the material be sufficiently elastic and strong for the purpose and be sanitary, easily cleaned, and not impart an objectionable flavor to the fish.

For ease of description, the operation has been described with detecting elements 54 and 56 in extreme positions but it is to be realized that when the detecting elements are in positions intermediate to those extreme positions described, intermediate command signals will result in intermediate machine speeds. Thus, within the range of control, infinitely variable speed adjustment is obtained in conformance with the position of the detecting elements.

It is also to be realized that the degree of control related to each of the detecting elements need not be equal, but can be proportioned as required to function as desired.

From the foregoing description which is limited to the explanation of the operation of one form of the invention, it is to be understood that various modifications of the invention will become apparent to those skilled in the art; therefore, the full scope of the invention is set forth in the appended claims.

I claim:

1. In a fish cutting and canning operation in which is provided a fish cutting machine, a fish canning machine and a generally horizontal fish delivery tunnel for delivering cut up fish from the fish cutting machine to the fish canning machine; the improvement comprising: a first detecting means in the tunnel at a point remote from the fish cutting machine and close to the fish canning machine; a second detecting means in the tunnel at a location closer to the cutting machine than the first detecting means, each detecting means being operable to assume a first position when the tunnel at the location of the detecting means is not substantially filled to capacity with fish and operable to assume a second position when the tunnel at the location of the detecting means is substantially filled to capacity; control means responsive to the position of each detecting means, and; a variable speed drive means for driving the fish cutting machine, the speed of which determines the rate at which the fish cutting machine delivers cut up fish to the fish tunnel, said control means being operatively connected to said variable speed drive means to vary the speed of the drive means in response to the position of each of the detecting means.

2. Claim 1 in which the variable speed drive means is controlled to run at a pre-set maximum speed when both detecting means are in the first position; at a pre-set medium speed when the first detecting means is in its second position and the second detecting means is in its first position, and; at a still lower speed when both detecting means are in the second position.

3. In a fish cutting and canning operation in which is provided a fish cutting machine, a fish canning machine, and a fish delivery tunnel for delivering cup up fish from the fish cutting machine to the fish canning machine; the improvement comprising: a first opening in an upper wall portion of the fish tunnel through which is positioned a vertically movable shoe member of a first detecting unit, said first opening being remotely located from the fish cutting machine and closely located with respect to the canning machine; a second opening in the upper wall portion of the fish tunnel located in a direction toward the fish cutting machine from the first opening, and having positioned therethrough a vertically movable shoe member of a second detecting unit; each of said shoe members being resiliently urged downward into the tunnel to a first position and being upwardly movable to a second position by fish in the tunnel building up to a sufficient height at the location of the shoe member to substantially fill the tunnel at that location; each of said shoe members being operatively connected to an electrical signal generating device with the magnitude of the signal generated being proportional to the vertical position of the shoe member; control means for receiving signals from the signal generating devices; a variable speed hydraulic motor for driving the fish cutting machine and varying the rate of delivery of cut up fish from the fish cutting machine into the fish tunnel, and; electrically controlled variable delivery hydraulic pump means for varying the speed of the hydraulic motor in response to an electrical command signal generated in the control means in accordance with the position of the shoe members.

4. Claim 3, in which; when the shoe member of the first detecting unit is in its first position, extending downwardly into the fish tunnel, and the shoe member of the second detecting unit is also in its first position, the electrical signal generating device operatively associated with each shoe member will transmit a signal to the control means, which in turn will transmit a responsive signal to the electrically controlled variable delivery hydraulic pump means to cause the variable speed hydraulic motor to run at a pre-set maximum speed: when the first shoe member is in its second position and the second shoe member is in its first position the hydraulic motor will be caused to run at a predetermined medium rate speed, and; when both shoe members are in the second position, the hydraulic motor will be caused to run at a pre-set minimum speed.

5. Claim 4 in which the electrical signal generating device operatively connected to each shoe member is a linear variable differential transformer.

References Cited in the file of this patent

UNITED STATES PATENTS

| | | |
|---|---|---|
| 2,162,443 | Muller | June 13, 1939 |
| 2,226,019 | Rooney | Dec. 24, 1940 |
| 2,745,410 | Molins | May 15, 1956 |
| 2,858,614 | Schuenemann | Nov. 4, 1958 |
| 2,966,186 | Garapolo | Dec. 27, 1960 |